March 14, 1933.  W. J. LEWIS  1,901,310
STALK CUTTING MACHINE
Filed Sept. 3, 1932  2 Sheets-Sheet 1

INVENTOR.
W. J. Lewis
BY J. T. Newton
ATTORNEYS.

March 14, 1933.  W. J. LEWIS  1,901,310
STALK CUTTING MACHINE
Filed Sept. 3, 1932  2 Sheets-Sheet 2

INVENTOR:
W. J. Lewis
BY J. T. Newton
ATTORNEYS.

Patented Mar. 14, 1933

1,901,310

UNITED STATES PATENT OFFICE

WILLIAM JULIUS LEWIS, OF CLARKSDALE, MISSISSIPPI

STALK-CUTTING MACHINE

Application filed September 3, 1932. Serial No. 631,714.

This invention relates to improvements in stalk-cutting machines of that type in which the machine is propelled astride of a row of plants, such as corn or cotton, and operates to cut the stalks of the plants into small pieces, which drop to the ground. These small pieces are easily covered by earth in a subsequent plowing of the field. One of the objects of the present invention is to provide a machine in which the front part is open to admit the stalks in an upright position, means being provided to guide the stalks to the cutting blades. Another object of the invention is to provide a transmission whereby the traction of both supporting wheels of the machine can be utilized in driving the rotatable shaft carrying the cutting blades, the transmission including means whereby one of the supporting wheels can turn at a slower rate than the other wheel without affecting the drive of the faster turning wheel. The means for carrying out these objects are described in detail hereinafter.

In the drawings, in which similar reference characters designate corresponding parts:—

Figure 1:
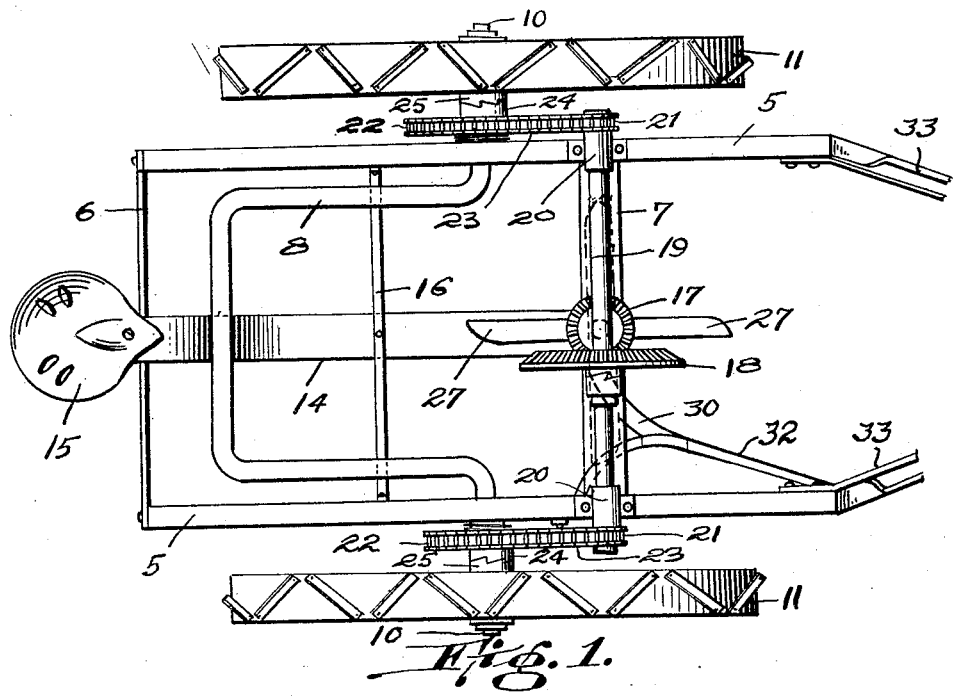
Figure 1 is a plan view of a stalk-cutting machine embodying the invention.
Figure 2:
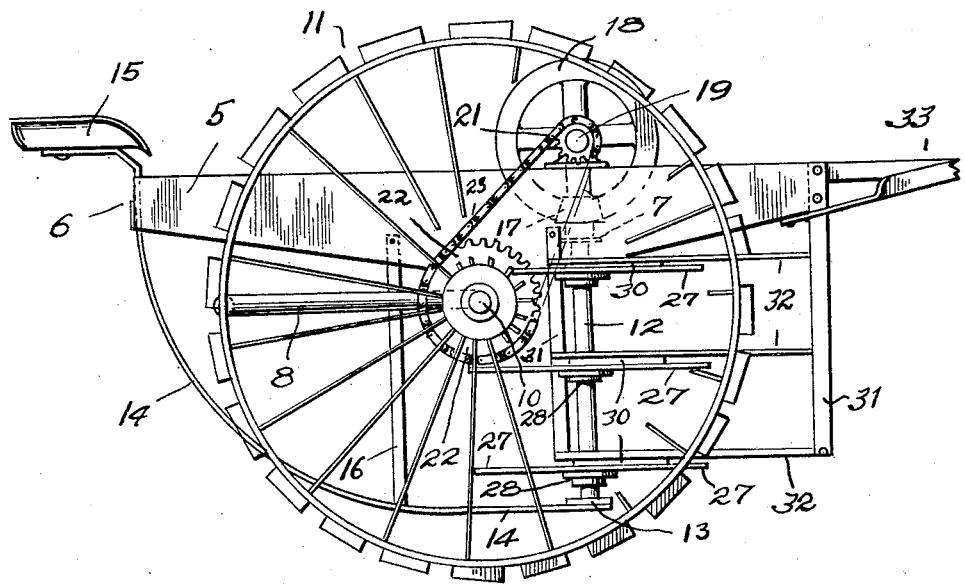
Figure 2 is a side elevation.
Figure 3:
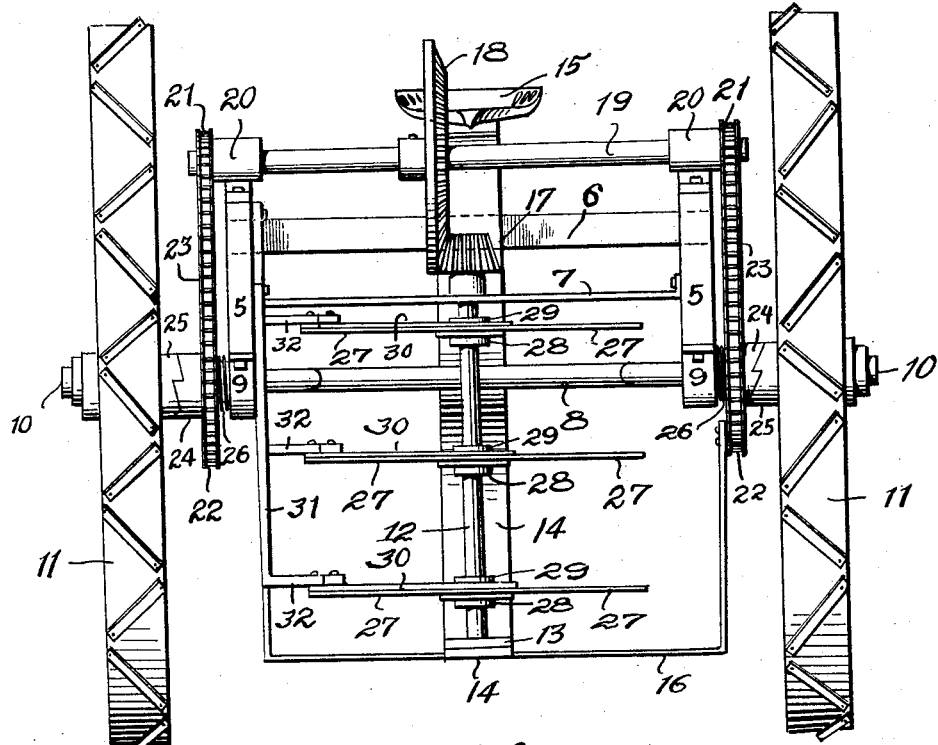
Figure 3 is a front elevation.
Figures 4, 5:
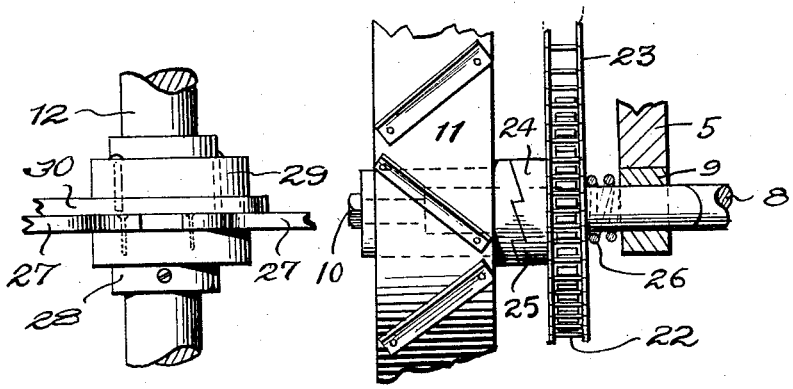
Figure 4 is an enlarged detail view showing the one-way clutch in the transmission between the traction wheel and the sprocket connection.
Figure 5 is a similar view, showing the mounting of the cutting blades on the driving shaft.

Referring to the drawings in detail, the frame of the machine comprises the longitudinal side-pieces 5 connected at their rear ends by the cross-piece 6 and at their intermediate parts by the cross-piece 7. Extending across the under side of the middle part of the frame is the U-shaped axle 8 with its U-part projecting horizontally to the rear of the frame. The ends of the axle are seated in the blocks 9 bolted to the lower edges of the side-pieces 5. The ends of the axle are tightly held by the blocks so that the axle is firmly held in its horizontal position. The ends of the axle project beyond the blocks and form bearings 10 on which are journaled the traction wheels 11 for carrying the machine and driving the cutting mechanism.

Midway between the side-pieces 5 of the frame, in advance of the axial line of the wheels 11, is the vertical shaft 12 journaled at its upper end in the cross piece 7. The lower end of the shaft is journaled in the step 13 carried by the forward end of the curved metal support 14 extending rearwardly over the cross-piece 6 at the rear of the frame. This support is formed of stiff spring metal and to its extreme rear end is attached the driver's seat 15. At an intermediate part the support is attached to the U-shaped cross-piece 16 secured at its ends between the side-pieces 5.

On the upper end of the vertical shaft 12 is fixed the bevel-gear 17 meshing with the larger bevel-gear 18 fixed on the horizontal shaft 19 extending transversely of the frame with its ends journaled in the bearing blocks 20 bolted on the upper edges of the side-pieces 5. On each end of this horizontal shaft, outside of the adjacent bearing block, is fixed the sprocket wheel 21 in approximately the same vertical plane with the larger sprocket wheel 22 journaled on the bearing 10 at the end of the axle 8. The two sprocket wheels are connected by the sprocket chain 23. The hub 24 of the sprocket wheel 22 forms a clutch member coacting with the complementary clutch member 25 formed on the hub of the adjacent traction wheel 11. A coil spring 26, compressed on the bearing 10 between the side-piece 5 and the sprocket wheel 22, normally presses the latter outwardly to engage the two clutch members. The inclination of the teeth of the clutch members 24—25 is such that they engage when the adjacent traction wheel 11 turns as the machine moves forward, but if there is a reverse turning movement of the wheel, the inclination of the teeth permit relative slipping movement of the two clutch members. In the normal forward movement of the machine the drive of both traction wheels 11 is transmitted by their respective clutches and the intervening gearing to the shaft 19, but when one of the wheels is turned faster than the other, as in turning the machine, the drive of the faster turning wheel is transmitted while the clutch members of the slower turning wheel slip to accommodate the accelerated drive imparted to the shaft 19 by the faster turning wheel. Also, when the machine is backed, the members of the clutches do not engage and there is no reverse rotation of the shaft 18.

On the vertical shaft 12 are radially mounted three sets of cutting blades 27, in vertically spaced relation. There are four blades in each set and they are fixed at their inner ends on the hub 28 fast on the shaft 12. Journaled on the shaft 12, above each hub 28, is a collar 29, to which is secured the inner end of the stationary blade 30 to coact with the blades 27 of the adjacent set as the latter are revolved by the shaft 12. The outer end of the blade 30 is secured to a fixed part of the machine, as will be explained further on.

Mounted in the forward part of the machine and to one side therof is a grating comprising the uprights 31 bolted to one of the sides 5 of the main frame. Extending between the uprights, with their ends secured thereto, are the horizontal cross-bars 32. These cross-bars are curved inwardly toward their rear ends and secured to the same are the outer ends of the stationary cutting blades 30. The grating operates to guide the stalks between the fixed and revolving cutting blades.

Attached to the forward ends of the sides 5 of the main frame are the brackets 33 for coupling the usual draft rigging (not shown) for propelling the machine.

In the operation of the machine, it is propelled along a row of stalks with the latter in line with the longitudinal center of the machine. As the stalks enter between the ends of the sides 5 of the main frame, they are engaged by the revolving blades 27 and pressed toward the grating 31—32 to be guided by the cross-bars 32 against the stationary blades 30 to be cut into small pieces as the blades 27 continue to revolve. The short pieces of the stalks fall to the ground and are easily turned under by a subsequent plowing of the soil. It is to be observed that the front of the machine is open and clear of obstructions so that the stalks can enter between the sides 5 in an upright position to be engaged by the cutting blades. Also, in the rear of the machine the parts are few and are so arranged that the severed stalks cannot collect and clog the operation.

It is to be noted that the axle 8 does not extend directly across the machine between the wheels, but has a U-shaped rear extension. This extenstion provides the necessary stability to the axle and at the same time offers no obstruction to the rearward movement of the cut stalks during the forward progress of the machine. Likewise, the drop in the members 14 and 16 offer but little obstruction to the cut stalks so that the latter can fall clear of the machine.

As the machine moves forward in a direct line, the traction wheels 11 turn at the same rate and the drive of both of them is utilized to drive the cutting blades. The drive of each traction wheel is transmitted through the one-way clutch 24—25, and the sprocket connection 21—23 to shaft 19, driving through the gears 17—18 the shaft 12 carrying the blades 27. By utilizing the drive of both traction wheels to revolve the cutting blades the strain is distributed to both sides of the machine; also, the power of the drive is amplified so that there is but little possibility of tough stalks choking the operation of the cutting blades. Should the two traction wheels turn at different speeds, when the machine makes a turn for an instance, the one-way clutch 24—25 of the slower turning wheel permits a slip in the transmission of the drive from that wheel so that the cutting blades can be driven by the faster turning wheel. When the machine is backed the one-way clutches at both wheels slip so that no drive is imparted to the cutting blades.

What I claim is:—

1. In a machine for cutting stalks, the combination of an axle having spindles at its ends and a horizontal U-shaped intermediate part extending to the rear of the machine, opposite traction wheels journaled on the spindles of the axle, a frame mounted on the spindle parts of the axle, a vertical shaft journaled in the frame in advance of the U-shaped part of the axle, a gearing for transmitting the drive of at least one of the tractor wheels to the vertical shaft to rotate the latter, sets of horizontal cutting blades fixed on the vertical shaft in spaced vertical relation, stationary cutting blades respectively coacting with the sets of cutting blades fixed on the vertical shaft, and a grating mounted in the forward part of the frame to guide the stalks between the coacting cutting blades as the machine moves forward.

2. In a machine for cutting stalks, the combination of an axle having spindles at its ends and a horizontal U-shaped intermediate part extending to the rear of the machine, opposite traction wheels journaled on the spindles of the axle, a frame including longitudinal sides mounted on the spindle parts of the axle and a central longitudinal member extending below the U-shaped part of the axle, a vertical shaft journaled in the frame of the machine in advance of the U-shaped part of the axle and with its lower end stepped on the forward end of the central longitudinal member of the frame, a gearing for transmitting the drive of at least one of the tractor wheels to the vertical shaft to rotate the latter, sets of horizontal cutting blades fixed on the vertical shaft in spaced vertical relation, a grating mounted in the forward part of the frame, and a stationary cutting blade coacting with each set of cutting blades fixed on the vertical shaft, each of said stationary blades being fixed at its inner end on a collar loose on the vertical shaft and fixed at its outer end to the grating, said grating operating to guide the stalks between the coacting cutting blades as the machine moves forward.

3. In a machine for cutting stalks, the combination of an axle having spindles at its ends and a horizontal U-shaped intermediate part extending to the rear of the machine, opposite traction wheels journaled on the spindles of the axle, a frame mounted on the spindle parts of the axle, a vertical shaft journaled in the frame in advance of the U-shaped part of the axle, a gearing including a one-way clutch for transmitting the drive of each tractor wheel to the vertical shaft to rotate the latter during the forward movement of the machine, sets of horizontal cutting blades fixed on the vertical shaft with the sets in vertical spaced relation, stationary cutting blades respectively coacting with the sets of cutting blades fixed on the vertical shaft, and a grating mounted in the forward part of the frame to guide the stalks between the coacting cutting blades as the machine moves forward.

In testimony whereof I affix my signature.

WM. JULIUS LEWIS.